(12) United States Patent
Kerstetter et al.

(10) Patent No.: US 12,519,291 B2
(45) Date of Patent: Jan. 6, 2026

(54) CABLE STRIPPING FIXTURE

(71) Applicant: TE Connectivity Services GmbH, Schaffhausen (CH)

(72) Inventors: Chadwick Alan Kerstetter, Middletown, PA (US); Mandar Desphande, Schaffhausen (CH)

(73) Assignee: TE Connectivity Solutions GmbH (CH)

( * ) Notice: Subject to any disclaimer, the term of this patent is extended or adjusted under 35 U.S.C. 154(b) by 267 days.

(21) Appl. No.: 17/834,305

(22) Filed: Jun. 7, 2022

(65) Prior Publication Data
US 2022/0399702 A1   Dec. 15, 2022

Related U.S. Application Data

(60) Provisional application No. 63/208,789, filed on Jun. 9, 2021.

(51) Int. Cl.
H02G 1/12 (2006.01)

(52) U.S. Cl.
CPC .................. H02G 1/1214 (2013.01)

(58) Field of Classification Search
CPC ...... H02G 1/12; H02G 1/1204; H02G 1/1207; H02G 1/1209; H02G 1/1212; H02G 1/1214; H02G 1/1219; H02G 1/1224; H02G 1/1229
USPC .......... 30/90.1, 91.2, 175; 81/9.4, 9.42, 9.44
See application file for complete search history.

(56) References Cited

U.S. PATENT DOCUMENTS

| | | | | |
|---|---|---|---|---|
| 2,539,776 A | * | 1/1951 | Gordon | H02G 1/1214 30/91.2 |
| 2,664,769 A | * | 1/1954 | Rennie et al. | H02G 1/1214 30/91.2 |
| 2,704,000 A | * | 3/1955 | Miller | H02G 1/1229 30/91.2 |
| 2,795,982 A | * | 6/1957 | Mathias | H02G 1/1214 30/91.2 |

(Continued)

FOREIGN PATENT DOCUMENTS

| | | | | |
|---|---|---|---|---|
| CN | 109193487 A | | 1/2019 | |
| CN | 117480697 A | * | 1/2024 | .......... H02G 1/1214 |

(Continued)

OTHER PUBLICATIONS

Machine Translation of FR-1600789-A (Year: 1970).*
International Search Report, International App. No PCT/IB2022/055387International Filing Date Jun. 9, 2022.

*Primary Examiner* — Jason Daniel Prone

(57) ABSTRACT

A cable stripping fixture includes a depth gauge block having a first plurality of cable openings formed therein. Each of the first plurality of cable openings is sized to receive at least a portion of a first type of cable. A guide plate is fixed to the depth gauge block and includes a second plurality of cable openings formed therethrough. Each of the second cable openings is coaxially aligned with one of the first plurality of cable openings. A blade holder of the fixture is connected to one of the depth gauge block or the guide plate, and is movable between a cutting position and a cable insertion position. A blade is fixed to the blade holder for engaging with a cable inserted into the depth gauge block and the guide plate.

20 Claims, 4 Drawing Sheets

(56) References Cited

U.S. PATENT DOCUMENTS

| | | | | | |
|---|---|---|---|---|---|
| 2,902,894 | A | * | 9/1959 | Koos, Jr. | H02G 1/1214 81/9.44 |
| 2,995,052 | A | * | 8/1961 | Funcik | H02G 1/1214 30/90.1 |
| 3,254,407 | A | * | 6/1966 | Apa et al. | H02G 1/1224 30/91.2 |
| 3,557,643 | A | * | 1/1971 | Weglin | H02G 1/1214 81/9.4 |
| 3,710,406 | A | * | 1/1973 | Stanford | H02G 1/1214 30/90.1 |
| 4,094,213 | A | * | 6/1978 | Bradley | H02G 1/1214 30/90.1 |
| RE30,342 | E | * | 7/1980 | Perrino | H02G 1/1214 81/9.4 |
| 4,246,808 | A | * | 1/1981 | Sandy | H02G 1/1214 30/90.1 |
| 4,366,619 | A | * | 1/1983 | Bieganski | H02G 1/1224 30/90.1 |
| 4,409,713 | A | * | 10/1983 | Johnston | H02G 1/1214 30/90.1 |
| 4,536,939 | A | * | 8/1985 | Hardesty | H02G 1/1214 7/131 |
| 4,677,702 | A | * | 7/1987 | Cairns | H02G 1/1214 30/90.1 |
| 4,838,129 | A | * | 6/1989 | Cope | H02G 1/1256 81/9.51 |
| 5,060,329 | A | * | 10/1991 | Hudson | H02G 1/1214 30/90.1 |
| 5,398,413 | A | * | 3/1995 | Chen | H02G 1/1224 30/91.2 |
| 5,829,322 | A | * | 11/1998 | Chen | H02G 1/1224 30/91.2 |
| 5,956,789 | A | * | 9/1999 | Chou | H02G 1/1214 30/90.1 |
| 6,081,953 | A | * | 7/2000 | Chou | H02G 1/1214 30/90.1 |
| 6,089,125 | A | * | 7/2000 | Cheng | H02G 1/1212 81/9.44 |
| 6,439,084 | B1 | * | 8/2002 | Ebert | H02G 1/1212 81/9.44 |
| 6,581,291 | B1 | * | 6/2003 | Tarpill | H02G 1/1217 30/90.1 |
| 7,040,020 | B2 | * | 5/2006 | Malet | H02G 1/1217 30/90.1 |
| 7,137,204 | B2 | * | 11/2006 | Wiste | H02G 1/1214 30/90.1 |
| 8,453,332 | B2 | * | 6/2013 | Elberbaum | B26D 1/04 30/90.1 |
| 8,678,671 | B2 | * | 3/2014 | Mulligan | G02B 6/25 81/9.44 |
| 9,138,880 | B2 | * | 9/2015 | Wang | H02G 1/1214 |
| D749,391 | S | * | 2/2016 | Payne | D8/98 |
| 10,511,155 | B1 | * | 12/2019 | Brannan | H02G 1/1256 |
| 10,819,092 | B2 | * | 10/2020 | Wang | H02G 1/1214 |
| 11,133,635 | B2 | * | 9/2021 | Kelly | H02G 1/1236 |
| 2004/0025259 | A1 | * | 2/2004 | Yen | H02G 1/1214 7/108 |
| 2023/0009862 | A1 | * | 1/2023 | Jenkins | H02G 1/1207 |

FOREIGN PATENT DOCUMENTS

| | | | | |
|---|---|---|---|---|
| DE | 112022002963 T5 | * | 3/2024 | H02G 1/1214 |
| FR | 1203159 A | * | 1/1960 | H02G 1/1214 |
| FR | 1597929 A | * | 6/1970 | H02G 1/1214 |
| FR | 1600789 A | * | 7/1970 | H02G 1/1214 |
| KR | 20090012235 U | | 3/2010 | |
| KR | 20060132128 A | | 12/2012 | |
| WO | WO-2022259206 A1 | * | 12/2022 | H02G 1/1258 |

* cited by examiner

CABLE STRIPPING FIXTURE

CROSS-REFERENCE TO RELATED APPLICATIONS

This application claims priority under 35 U.S.C. § 119 to U.S. Provisional Patent Application No. 63/208,789, filed on Jun. 9, 2021.

FIELD OF THE INVENTION

The present disclosure relates to the field of cable processing, and more specifically, to a fixture for aiding in cable stripping operations.

BACKGROUND

Prior to installing an electrical connector onto a cable (e.g., a coaxial cable) or wire, one or more stripping operations must be performed to selectively expose various layers or components of the cable. These processes typically include cutting circumferentially about an exposed surface of the cable to a predetermined depth, and removing one or more layers of the cable freed by the cut. Performing these operations without damaging the underlying layers of the cable can be critical to cable integrity and performance. Thus, the cutting steps are required to be performed with a relatively high degree of precision and accuracy. While fully-automated cable processing systems may be capable of performing the above-described operations effectively, such systems are costly and time-consuming to implement. Accordingly, the use of these systems may not be of sufficient value, particularly for low-volume or development applications. As a result, accurate manual cable processing systems and methods are still of significant value to the industry.

SUMMARY

A cable stripping fixture according to an embodiment of the present disclosure includes a depth gauge block having a first plurality of cable openings formed therein. Each of the first plurality of cable openings is sized to receive at least a portion of a first type of cable. A guide plate is fixed to the depth gauge block and includes of a second plurality of cable openings formed therethrough. Each of the second plurality of cable openings is coaxially aligned with one of the first cable openings. A blade holder of the fixture is movably connected to one of the gauge block or the guide plate, and is movable between a cutting position and a wire-insertion position. A blade is fixed to the blade holder for cutting an exterior surface of a cable inserted through the wire guide plate and into the depth gauge block.

BRIEF DESCRIPTION OF THE DRAWINGS

The invention will now be described by way of example with reference to the accompanying Figures, of which.

DETAILED DESCRIPTION OF THE EMBODIMENTS

Figure 1:
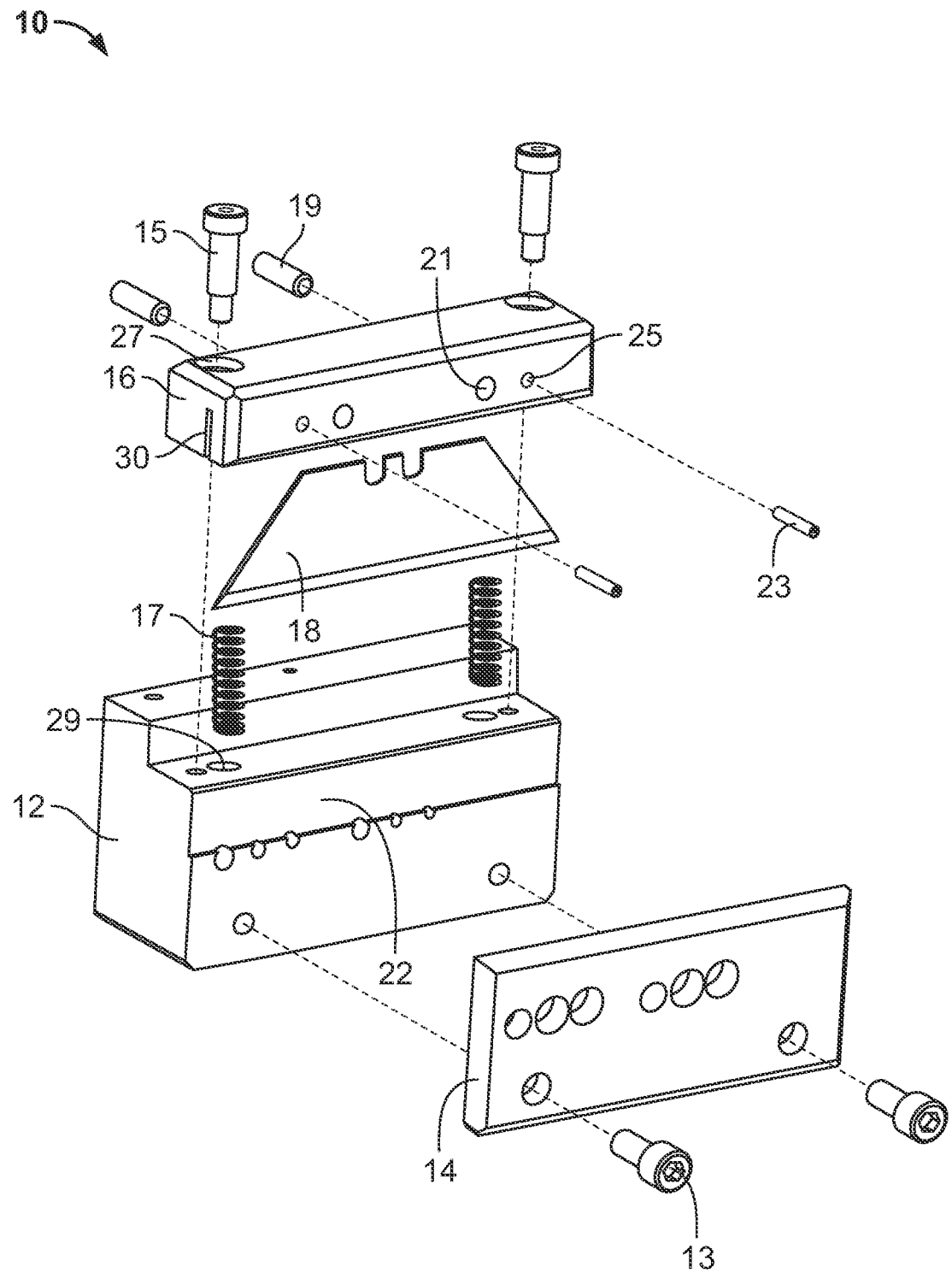
FIG. 1 is an exploded perspective view of a wire stripping fixture according to an embodiment of the present disclosure.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiment set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As set forth above, embodiments of the present disclosure include an improved cable or wire stripping fixture aiding the performance of multiple cutting and/or stripping operations on wires or cables of several predetermined sizes or types. In one embodiment, a cable stripping fixture includes a depth gauge block having a first plurality of cable openings formed therein. A first subset of the first plurality of cable openings are sized to receive at least a portion of a first type of cable in various stages of processing, and a second subset of the first plurality of cable openings are sized to receive at least a portion of a second type of cable, distinct from the first type, in various stages of processing. A wire or cable guide plate is fixed to the depth gauge block and includes a second plurality of cable openings formed therethrough. Each of the second cable openings is coaxially aligned with one of the first cable openings and is sized to accept at least portions of the first or second cable types in various stages of processing. A blade holder of the fixture is movably connected to one of the gauge block or the guide plate, and is movable between a cutting position and an open or cable-insertion position. A blade is fixed to the blade holder for engaging with a cable or wire inserted through the cable guide plate and into the depth gauge block.

Figure 2:
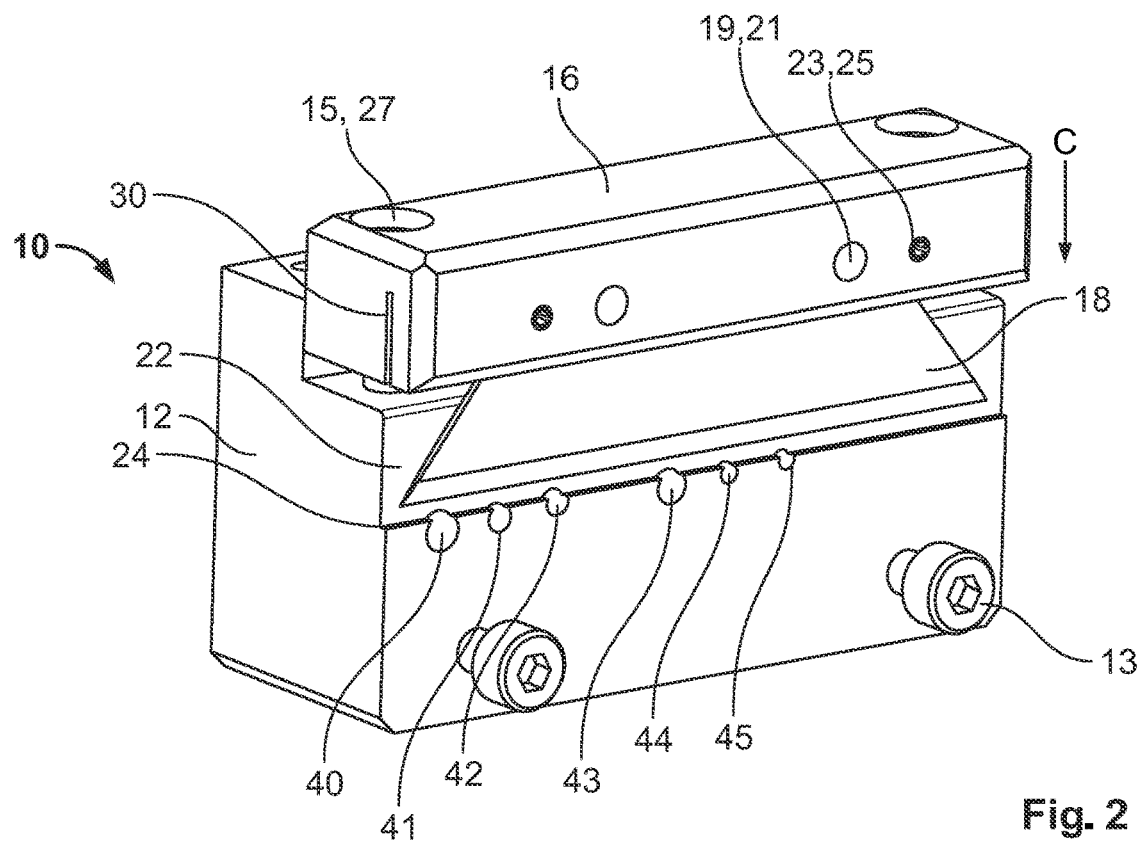
FIG. 2 is a front perspective view of the wire stripping fixture of FIG. 1 in a partially assembled state with a wire guide plate thereof removed.
Figure 3:
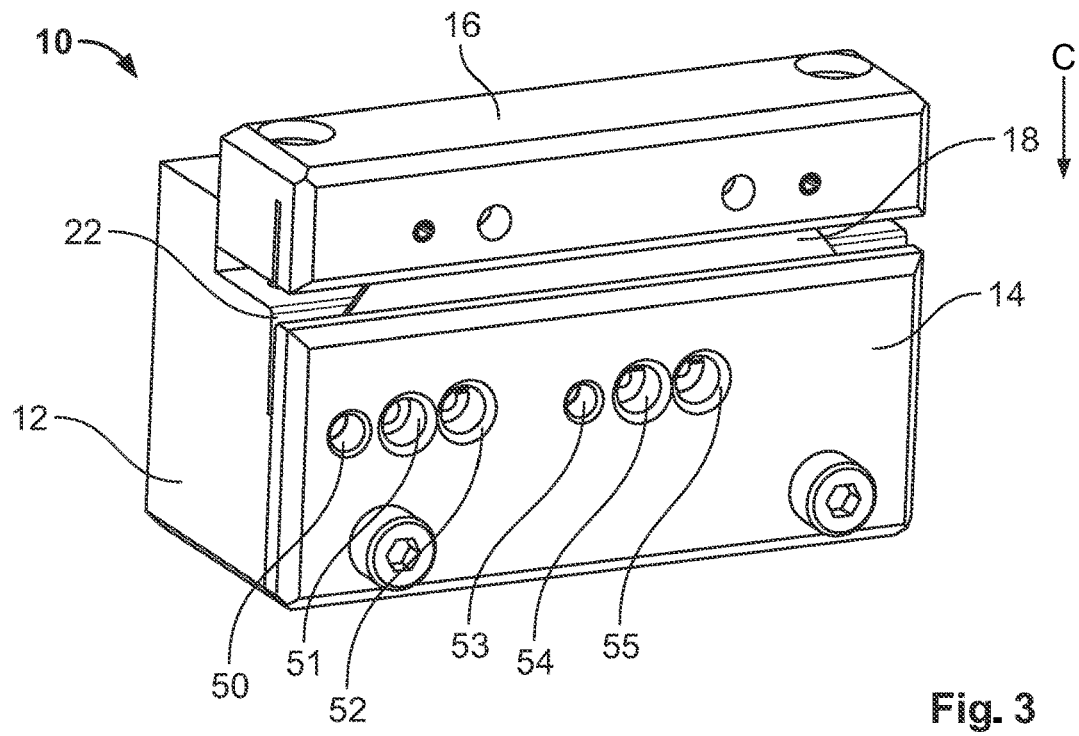
FIG. 3 is a front perspective view of the wire stripping fixture of FIG. 1 in an assembled state.
Figure 4:
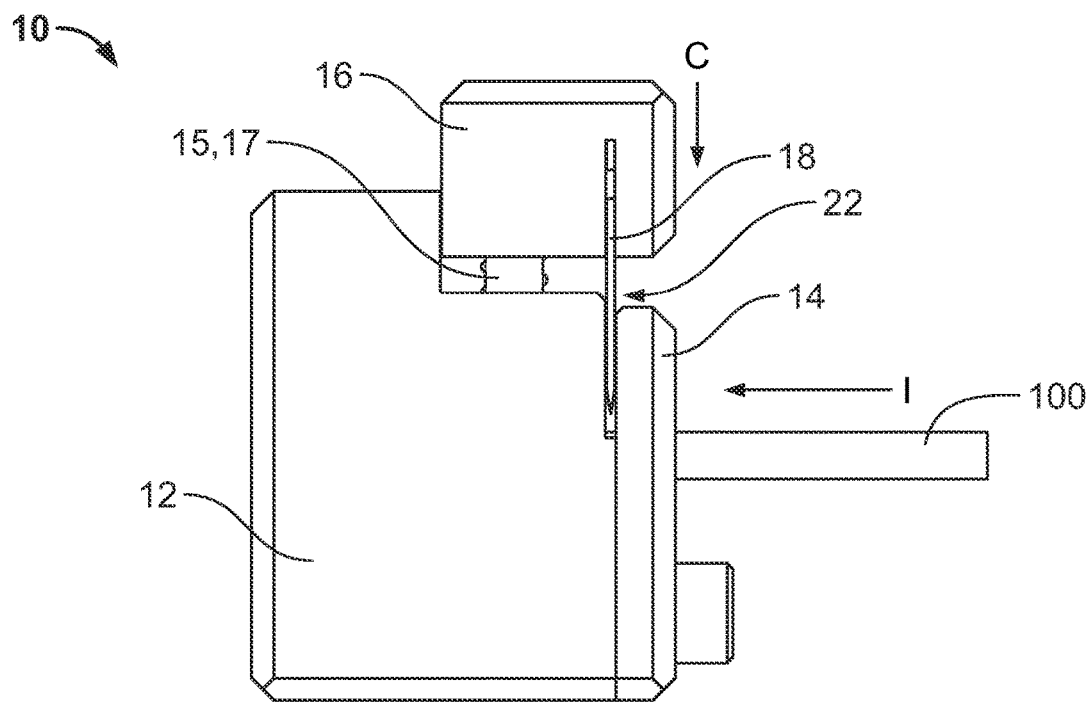
FIG. 4 is side perspective view of the wire stripping fixture of FIG. 3 in an open or wire-insertion position.

Referring generally to FIGS. 1-5, a wire or cable stripping fixture 10 according to an embodiment of the present disclosure includes a depth gauge block 12, a wire or cable guide plate 14, a blade holder 16 and a blade 18. The guide plate 14 may be selectively fixed to a front face of the depth gauge block 12 via a plurality of fasteners 13. The depth gauge block 12 includes a recess 22 formed in a face that opposes the guide plate 14 in an assembled state. In this way, the depth gauge block 12 and the guide plate 14 define a slot therebetween via the recess 22 for receiving the blade 18. A bottom surface 24 of the recess 22 forms a positive stop for setting the maximum cutting depth of the blade 18, as shown in FIGS. 2 and 4.

The blade holder 16 is movably mounted to the depth gauge block 12 via, for example, a plurality of sliding pins or shouldered fasteners 15. In one embodiment, the sliding pins 15 are inserted through corresponding apertures in the blade holder 16, and threadedly connected to the depth gauge block 12. A pair of openings 27 formed in the blade holder 16 receiving the sliding pins 15 may be counter sunk or counter bored for receiving a head of the pin or fastener and provide a generally planar top surface onto which force may be applied by a user. The length of the corresponding interfacing sliding surfaces of the sliding pins 15 and the blade holder 16 are selected such that vertical movement of the blade holder 16 and the blade 18 relative to the depth gauge block 12 is enabled.

Figure 5:
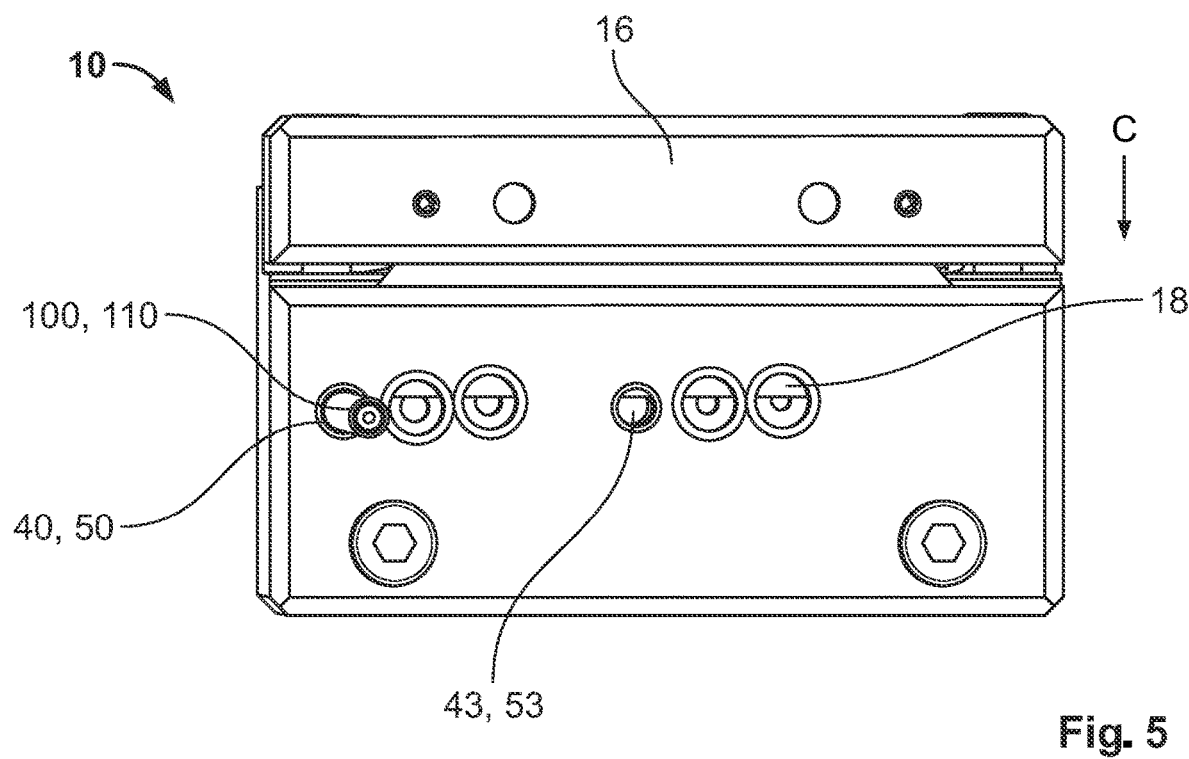
FIG. 5 is a front perspective view of the wire stripping fixture of FIG. 3 in a cutting or stripping position.

A pair of springs 17 are arranged between the depth gauge block 12 and the blade holder 16. The springs 17 are operative to bias the blade holder 16 vertically upward into an open position away from the depth gauge block 12. In this way, downward pressure on the blade holder 16 (i.e., by a user) is operative to bias the blade holder 16 and the blade 18 in a cutting direction C against the return or biasing force of the springs 17 and into a cutting position as shown in FIG. 5. At least a portion of each spring 17 may be received in an aperture or counterbore 29 formed in the depth gauge block 12 for supporting the spring throughout its travel or compression. In some embodiments, corresponding apertures or counterbores may be formed in an underside of the blade holder 16 for receiving an opposite end of each spring 17. In still other embodiments, each spring 17 may be arranged coaxially over, and thus supported by, a respective one of the sliding pins 15, and between the blade holder 16 and the depth gauge block 12.

The blade holder 16 includes a slot 30 sized to receive the blade 18. The blade 18 may be mounted to the blade holder 16 via, for example, a plurality of fixation pins 19 arranged through corresponding coaxial openings or holes 21 formed through the holder and the blade. Spring pins 23 may be inserted through a second set of openings 25 in the depth gauge block 12. The spring pins 23 may be positioned to abut against the blade 18 for preventing its unintended deflection and/or articulation during cutting operations.

As shown in FIGS. 2 and 3, each of the depth gauge block 12 and the guide plate 14 define at least one set of holes or openings of differing diameters corresponding to the diameters of a plurality of various layers of a wire or cable to be stripped. In the exemplary embodiment, the fixture 10 includes two sets of openings corresponding to the layers of two different standardized cables (i.e., RTK 031 and RG 174, by way of example). In this way, the single fixture 10 may be used to strip two types of cable. In other embodiments, fewer or additional sets of openings may be provided for processing a corresponding number of cable types.

More specifically, as shown in FIG. 2, the depth gauge block 12 defines a first plurality of holes or openings 40, 41, 42, and a second plurality of holes or openings 43, 44, 45, formed therein in a direction transverse to the cutting direction C of the blade 18. Likewise, the guide plate 14 defines a corresponding first plurality of holes 50, 51, 52 coaxially aligned with respective ones of the first plurality of holes 40, 41, 42 of the depth gauge block 12, and a second plurality of holes 53, 54, 55 coaxially aligned with respective ones of the second plurality of holes 43, 44, 45. Each pair of aligned holes of the first plurality of holes have diameters which correspond to various dimensions of a cable to be processed thereby.

For example, each hole of the pair of holes 40,50 may be sized to accept an outer insulation layer or jacket of an RTK 031 cable 100 in an insertion direction I (see FIG. 4). See also FIG. 6A. Similarly, the pair of holes 41,51 may be sized to accept a folded back portion of an outer conductor of the RTK 031 cable 100 and a reminder of the cable (e.g., including a shielding layer thereof), respectively. See also FIG. 6B. The pair of holes 42,52 may be sized to accept the folded back portion of the outer conductor of the RTK 031 cable 100, and an exposed inner insulation layer thereof, respectively. See FIG. 6C. Likewise, the second plurality of holes of the depth gauge block 12 and the guide plate 14 may be sized to accept corresponding portions of an RG 174 cable, by way of non-limiting example only.

As shown most clearly in FIGS. 2 and 5, the bottom surface 24 of the recess 22 intersects each of the first and second plurality of holes of the gauge block 12 in a radially-inward direction, and to a depth corresponding to a thickness of the associated cable layer to be cut and/or stripped. The first and second plurality of holes 40-45 of the guide plate 14 are positioned such that the stop surface 24 is arranged at a common radial distance from the center of each opening. This radial distance corresponds to an inner diameter, or marginally less than an inner diameter, of the layer of the cable desired to be cut and/or stripped in the associated holes. In this way, the centers of each of the first plurality of holes 40, 41, 42 (as well as the second plurality of openings 43, 44, 45) are offset from one another in a vertical direction in order to position the blade 18 at a desired depth during cutting, as shown in FIG. 5.

With particular reference to FIG. 4, the RTK 031 cable 100 is shown inserted into the holes 40,50 of the fixture 10 in the insertion direction I, with the blade 18 in an open or insertion position. In use, downward pressure on the blade holder 16 is operative to lower the blade 18 into an outer insulation layer or jacket 110 of the cable 100, as shown in FIG. 5. The holes 40,50 are positioned such that the bottom wall or surface 24 of the recess 22 stops the blade 18 at, or just before, a position corresponding to the inner diameter of the jacket 110. After the initial depression of the blade holder 16 and the initial cutting of the jacket 110 via the blade 18, a user may rotate the cable 100 while maintaining pressure on the blade holder for completing the cut about the circumference of the jacket 110. In one embodiment, the jacket 110 may be removed from a remainder of the cable 100 by removing the cable in a direction opposite the insertion direction I while maintaining pressure on the blade holder 16. In this way, the blade 18 will retain and strip-away the cut portion of the jacket 110 from a remainder of the cable 100.

Figure 6A:
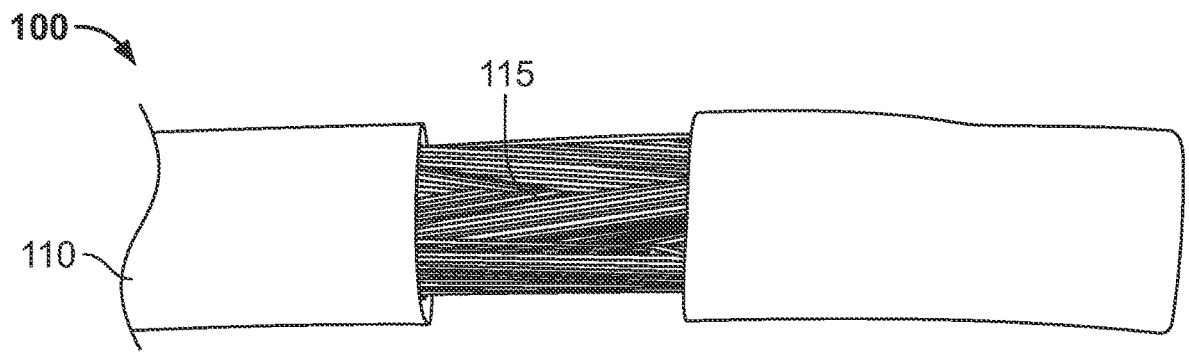
FIG. 6A is a top view of an exemplary cable after an outer insulation layer thereof has been partially stripped or removed using the wire stripping fixture according to embodiments of the present disclosure.
Figure 6B:
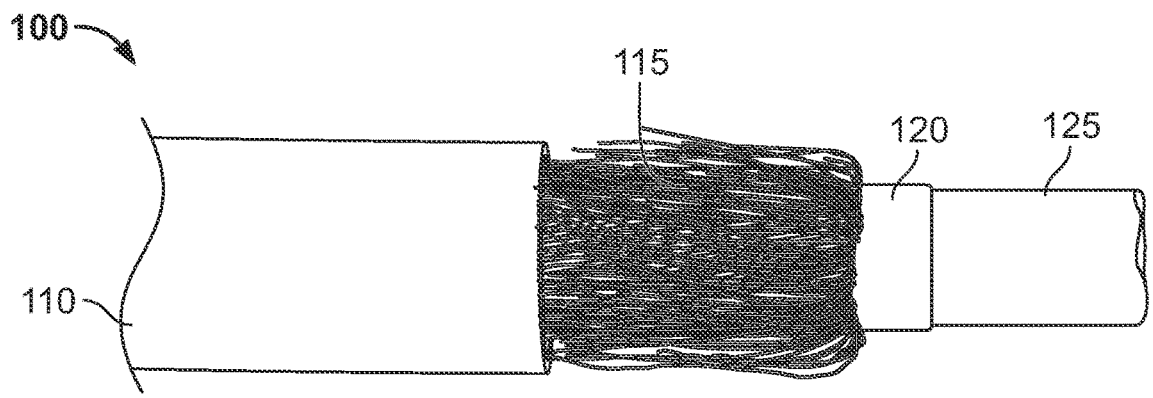
FIG. 6B is a top view of the cable of FIG. 6A after a shielding layer thereof has been partially stripped or removed using the wire stripping fixture according to embodiments of the present disclosure.
Figure 6C:
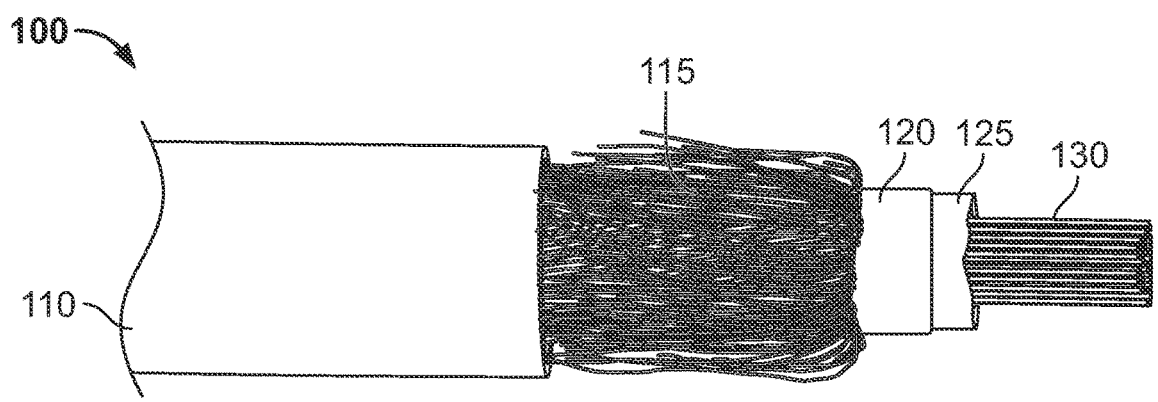
FIG. 6C is a top view of the cable of FIGS. 6A and 6B after an inner insulation layer thereof has been partially stripped or removed using the wire stripping fixture according to embodiments of the present disclosure.

Referring generally to FIGS. 6A-6C, a stripping process for preparing the RTK 031 (or RG 174) cable 100 for connectorization will be described in reference to the exemplary fixture 10 described in the preceding figures. As set forth above, the cable 100 includes an outer insulation layer or jacket 110, a multi-strand or braided outer conductor 115, a foil shield 120, an inner insulation layer 125 and a central conductor 130. In a first stripping step, the jacket 110 may be removed, as shown in FIG. 6A. This is achieved by fully inserting an end of the cable 100 into the openings 40,50 of the fixture 10, depressing the blade 18 via the blade holder 16 until it abuts the bottom surface 24 of the recess 22, and rotating the cable to cut the jacket 110 about its circumference.

Once the outer jacket 110 has been removed, a portion of the outer conductor 115 may be folded rearwardly (or removed entirely) for exposing a portion of the foil shield 120. In a subsequent second stripping step or operation, the exposed portion of the foil shield 120 is removed from a portion of the inner insulation layer 125, as shown in FIG. 6B. This is achieved by fully inserting the end of the cable 100 into the openings 41,51, depressing the blade 18, and rotating the cable to cut the foil shield 120 about its circumference.

Referring to FIG. 6C, in a third and/or final stripping step, the inner insulation layer 125 is removed from a portion of the central conductor 130. Specifically, the end of the cable 100 shown in FIG. 6B is fully inserted into the openings 42,52, the blade holder and blade 16,18 depressed, and the cable rotated for cutting the insulation layer 125 about its circumference. In each of the second and third stripping steps, insertion of the remaining portion of the cable 100 into the fixture 100 may fold back the layer exposed by the previous stripping operation, as shown in the figures. Specifically, the holes formed in the guide plate 14 may be sized so as to abut a face (i.e., an axially-facing surface) of these layers in the axial or insertion direction. In other embodiments, the holes of the guide plate 14 are sized in a clearance manner, such that no interference with the previously exposed layer is realized.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A cable stripping fixture, comprising:
   a depth gauge block having a first plurality of cable openings formed therein, each of the first plurality of cable openings closed about a perimeter of each of the first plurality of cable openings;
   a guide plate fixedly mounted to the depth gauge block and having a second plurality of cable openings formed therethrough, each of the second cable openings respectively coaxially aligned with one of the first cable openings;
   a blade holder connected to the depth gauge block and movable linearly between a cutting position and a cable insertion position; and
   a blade fixed to the blade holder, a cutting edge of the blade movably received within a blade recess formed between the depth gauge block and the guide plate, the cutting edge movable relative to the depth gauge block and the guide plate as the blade holder is moved between the cutting position wherein the blade intersects at least one of the first or second cable openings, and the cable insertion position wherein the blade does not intersect the first and second openings, the cutting edge of the blade extends linearly over a length of the blade and abuts in the cutting position against a positive stop formed by a surface of the depth gauge block that faces the blade recess.

2. The cable stripping fixture of claim 1, wherein the depth gauge block defines the blade recess receiving the blade.

3. The cable stripping fixture of claim 2, wherein:
   a first one of the first plurality of cable openings has a first diameter, the blade recess extending into the first one of the first plurality of cable openings to a depth of a second diameter relative to an axially extending central axis of the first one of the first plurality of cable openings, the second diameter less than the first diameter; and
   a second one of the first plurality of cable openings has a third diameter, the blade recess extending into the second cable opening in a radial inward direction of the second cable opening to a depth of a fourth diameter relative to an axially extending central axis of the second one of the first plurality of cable openings, the fourth diameter less than the third diameter.

4. The cable stripping fixture of claim 3, wherein a third one of the first plurality of cable openings has a fifth diameter, the blade recess extending into the third cable opening to a depth of a sixth diameter relative to an axially extending central axis of the third one of the first plurality of cable openings, the sixth diameter less than the fifth diameter.

5. The cable stripping fixture of claim 3, further comprising a third plurality of cable openings formed in the depth gauge block, wherein:
   a first one of the third plurality of cable openings has a fifth diameter, the blade recess extending into the first one of the third plurality of cable openings in a radial direction to a depth of a sixth diameter relative to an axially extending central axis of the first one of the third plurality of cable openings, the sixth diameter less than the fifth diameter; and
   a second one of the third plurality of cable openings has a seventh diameter, the blade recess extending into the second one of the third plurality of cable openings in a radial direction to a depth of an eighth diameter relative to an axially extending central axis of the second one of the third plurality of cable openings, the eighth diameter less than the seventh diameter.

6. The cable stripping fixture of claim 3, wherein:
   an axially extending central axis of the first one of the first plurality of cable openings is arranged at a first distance from the blade recess in a radial direction of the opening parallel to a direction of movement of the blade holder relative to the depth gauge block; and
   a central axis of the second one of the first plurality of cable openings is arranged at a second distance from the blade recess in a radial direction of the opening parallel to the direction of movement of the blade holder relative to the depth gauge block, the first distance greater than the second distance.

7. The cable stripping fixture of claim 2, wherein the blade recess is in direct communication with the first plurality of cable receiving openings.

8. The cable stripping fixture of claim 7, wherein the blade recess is defined in a first face of the depth gauge block, and the guide plate is fixed to the first face and over the recess.

9. The cable stripping fixture of claim 1, further comprising an elastic element biasing the blade holder into the cable insertion position relative to the depth gauge block.

10. The cable stripping fixture of claim 1, wherein the blade holder includes a slotted opening receiving the blade.

11. The cable stripping fixture of claim 10, wherein the blade is fixed within the slotted opening by at least one fastener.

12. The cable stripping fixture of claim 1, wherein an axially extending central axis of each of the first plurality of cable openings are arranged at distinct, non-equal distances from the blade recess in a direction of movement of the blade holder relative to the depth gauge block.

13. The cable stripping fixture of claim 1, wherein:
each of the first plurality of cable openings is a circular opening defined in the depth gauge block;
each of the second plurality of cable openings is a circular opening defined through the guide plate; and
the first plurality of cable openings maintain coaxial alignment with the respective second plurality of cable openings independent of a position of the blade holder relative to the depth gauge block.

14. The cable stripping fixture of claim 1, wherein the surface of the depth gauge block defining the positive stop is a bottom surface of the blade recess.

15. The cable stripping fixture of claim 14, wherein the bottom surface of the blade recess defining the positive stop intersects each of the first plurality of cable openings, by virtue of the distinct placement of each of the first plurality of cable openings in a vertical direction, the blade recess extends into each of the first cable openings to respective distinct depths.

16. The cable stripping fixture of claim 1, wherein the perimeter of the first plurality of cable openings are closed independent of a position of the blade holder relative to the depth gauge block.

17. A cable stripping fixture, comprising:
a depth gauge block defining a plurality of first cable openings each having a distinct diameter closed about their perimeter;
a blade holder movably connected to the depth gauge block and moveable linearly between a cutting position and a cable insertion position; and
a blade fixed to the blade holder and impinging into the first cable receiving openings in the cutting position and not impinging into the first cable receiving openings in the insertion position, the blade has a cutting edge that is movable within a blade recess defined by the depth gauge block, the cutting edge of the blade extends linearly over a length of the blade and abuts in the cutting position against a positive stop formed by a surface of the depth gauge block that faces the blade recess, wherein the surface of the depth gauge block defining the positive stop is a bottom surface of the blade recess, and intersects each of the plurality of first cable openings in a vertical direction such that the blade recess extends into each of the first cable openings to respective distinct depths, and the cutting edge of the blade abuts the positive stop simultaneously across its length as the blade holder is moved linearly and vertically from the cable insertion position to the cutting position.

18. The cable stripping fixture of claim 17, further comprising a guide plate fixed to the depth gauge block and having a plurality of second cable openings formed therethrough, each of the plurality of second cable openings respectively coaxially aligned with one of the plurality of first cable openings.

19. The cable stripping fixture of claim 18, wherein the cutting edge of the blade is movable within the blade recess relative to the depth gauge block and the guide plate as the blade holder is moved between the cutting position and the cable insertion position.

20. A cable stripping fixture, comprising:
a depth gauge block having a first plurality of cable openings formed therein, each of the first plurality of cable openings closed about a perimeter of each of the first plurality of cable openings;
a guide plate fixedly mounted to the depth gauge block and having a second plurality of cable openings formed therethrough, each of the second cable openings respectively coaxially aligned with one of the first cable openings;
a blade holder connected to the depth gauge block and movable linearly between a cutting position and a cable insertion position; and
a blade fixed to the blade holder, a cutting edge of the blade movably received within a blade recess formed between the depth gauge block and the guide plate, the cutting edge movable relative to the depth gauge block and the guide plate as the blade holder is moved between the cutting position wherein the blade intersects at least one of the first or second cable openings, and the cable insertion position wherein the blade does not intersect the first and second openings, the cutting edge of the blade extends linearly over a length of the blade and abuts in the cutting position against a positive stop formed by a surface of the depth gauge block that faces the blade recess, wherein respective axially extending central axes of the first plurality of cable openings are offset from one another in the linear direction of movement of the blade holder relative to the depth gauge block.

* * * * *